United States Patent
Pliss et al.

(10) Patent No.: US 8,091,077 B1
(45) Date of Patent: Jan. 3, 2012

(54) SYSTEM AND METHOD FOR HANDLING RARE EVENTS BY MODIFICATION OF EXECUTABLE CODE

(75) Inventors: Oleg A. Pliss, Santa Clara, CA (US); Ioi K. Lam, Mountain View, CA (US)

(73) Assignee: Oracle America, Inc., Redwood City, CA (US)

( * ) Notice: Subject to any disclaimer, the term of this patent is extended or adjusted under 35 U.S.C. 154(b) by 1484 days.

(21) Appl. No.: 11/545,578

(22) Filed: Oct. 11, 2006

(51) Int. Cl.
*G06F 9/45* (2006.01)
(52) U.S. Cl. .................. 717/140; 717/146; 717/148
(58) Field of Classification Search .................. None
See application file for complete search history.

(56) References Cited

U.S. PATENT DOCUMENTS

| | | | | |
|---|---|---|---|---|
| 5,838,969 A * | 11/1998 | Jacklin et al. | ................. | 719/318 |
| 5,933,622 A * | 8/1999 | Buzbee et al. | ................. | 703/22 |
| 6,625,804 B1 * | 9/2003 | Ringseth et al. | ............. | 717/114 |
| 7,624,033 B1 * | 11/2009 | Jean et al. | .................... | 705/7.26 |
| 2002/0065950 A1 * | 5/2002 | Katz et al. | ................... | 709/318 |
| 2003/0115375 A1 * | 6/2003 | Robison | ........................ | 709/318 |
| 2003/0188042 A1 * | 10/2003 | Anaya et al. | .................. | 709/318 |
| 2004/0027374 A1 * | 2/2004 | Cirne et al. | .................... | 345/744 |
| 2004/0139099 A1 * | 7/2004 | Weaver | ................. | 707/101 |
| 2006/0075210 A1 * | 4/2006 | Manohar et al. | ................ | 712/36 |
| 2006/0161907 A1 * | 7/2006 | Newport et al. | ............. | 717/151 |
| 2006/0242598 A1 * | 10/2006 | Marascio et al. | ............ | 715/810 |
| 2006/0294347 A1 * | 12/2006 | Zou et al. | ....................... | 712/244 |
| 2007/0079288 A1 * | 4/2007 | Willwerth et al. | ............ | 717/124 |
| 2008/0127060 A1 * | 5/2008 | Reamey | ........................ | 717/106 |
| 2011/0066623 A1 * | 3/2011 | Weissman | ...................... | 707/742 |

* cited by examiner

*Primary Examiner* — Insun Kang
(74) *Attorney, Agent, or Firm* — Marsh Fischmann & Breyfogle LLP; Jonathon A. Szumny; Kent A. Lembke

(57) ABSTRACT

Systems and methods for the efficient handling of rare events by modification of executable code is provided. The present invention eliminates the need for event checking code and handling in the primary execution path of compiled code by using a patch table to modify code during execution. Accordingly, event handling does not introduce additional instructions to the primary execution path, and thus will not interfere with compiler optimizations for maximal performance along the primary execution path. The present invention, therefore, provides event handling for events that occur rarely while reducing the size of the code for execution on memory-constrained devices.

17 Claims, 5 Drawing Sheets

SYSTEM AND METHOD FOR HANDLING RARE EVENTS BY MODIFICATION OF EXECUTABLE CODE

FIELD OF THE INVENTION

The present invention generally relates to event handling in computer software, and relates more particularly to handling rare events in memory-constrained devices.

BACKGROUND

In the field of computer software, an "event" is an action or occurrence in a computer system to which a computer program might respond. For example, an event may be a graphical user interface (GUI) event, such as key presses, mouse movement, or action selections. An event may also be the occurrence of a timer expiring. On a lower level, events can represent availability of new data for reading a file or network stream. The events are created by the operating system or run-time environment based on interpreting lower-level inputs, which may be lower-level events themselves. For example, mouse movements and clicks are interpreted as menu selections. The events may initially originate from actions on the operating system level, such as interrupts generated by hardware devices, software interrupt instructions, or state changes in polling. An event handler is a function written to handle one or more events as they occur during execution of a program.

Conventionally, event handling is often performed through polling, by a program, to check the state of an event queue to determine if a new event has been enqueued. The constant polling of the event queue causes continual disruption in the execution of the program. This problem is exacerbated when, in many cases, the events rarely occur. Programs often need to listen for these rare events and to handle them. When the program is ready to handle the events, it checks the state of the event queue and performs appropriate actions. The actions may depend on the current state of the program. For example, a program might poll for timer tick events, which occur when a specified timer interval has elapsed, to pass control to a thread scheduler. The events are rare, but the code for event handling needs to be generated and loaded into memory regardless of their rarity. Not only does the program become slower and its code become bloated, but the compiler also has to know that event handling code is very rarely executed. Otherwise the code generation and register allocation for frequently executed code becomes suboptimal.

The problem is exacerbated even further when programs are executed on memory-constrained devices, for example, portable wireless devices. One major limitation of these wireless devices is the relatively small amount of memory available for executing programs. The extra code needed for handling rare events bogs down the already-limited memory of the memory-constrained device. Accordingly, there is a need to optimize rare event handling in program code executing on memory-constrained devices.

SUMMARY

Systems and methods consistent with the present invention reduce memory requirements in memory-constrained devices by removing event handling code for rare events from a program and calling an event handler for these events only after detecting the event at run-time. Unlike conventional event handling systems and methods, methods and systems consistent with the present invention eliminate the need for event checking code and handling in the primary execution path of compiled code by using a patch table to modify code during execution. The patch table provides code that may be substituted, or patched, into the executing code at run-time to call an event handler. Accordingly, event handling does not introduce additional instructions to the primary execution path, and thus will not interfere with compiler optimizations for maximal performance along the primary execution path. Methods and systems consistent with the present invention, therefore, provide event handling for events that occur rarely while reducing the size of the code for execution on memory-constrained devices.

One embodiment consistent with the present invention is directed to a method in a data processing system for generating an event handling patch table for a program at compile-time, the data processing system including a compiler for compiling the program and a memory. The method includes selecting at least one location in the program to perform event handling, generating a patch table for event handling during execution of the compile program code, including recording the at least one selected location and a corresponding event handler, and storing the patch table in association with the compile program code. Selecting at least one location in the program may include selecting a branch instruction, a function call, a function return, or a long linear sequence of instructions. The method may further comprise compressing the patch table by determining whether two consequent entries in the patch table differ only by an offset value, and when the two consequent entries differ only by an offset value, removing the entry with the greatest offset value. Generating a patch table may include recording code to patch into executing program code. The compiler may be a Java compiler.

Another embodiment consistent with the present invention is directed to a computer-readable medium storing computer executable instructions for performing a method of event handling using a patch table during execution of a compiled program. The stored method includes detecting the occurrence of an event to be handled; determining from a patch table a corresponding event handler for handling the event; and executing the event handler. Determining from a patch table a corresponding event handler for handling the event may include determining the corresponding event handler from a location in a function of the executing program. The method may further comprise replacing an instruction at the location with a call to a global event handler, and calling the global event handler to execute the corresponding event handler. The method may further comprise storing the program state of the program before executing the corresponding event handler. Still further, the method may comprise determining whether the event is detected while user code is active, and when user code is not active, waiting until program control returns to a user thread before handling the event, storing the detection of the event.

Yet another embodiment consistent with the present invention is directed to a data processing system for handling events during execution of program code, comprising: a memory storing a virtual machine that selects, upon the occurrence of an event, an event handler based on a table indicating a function location and a corresponding event handler and executes the selected event handler to handle the event; and a processor for executing the virtual machine. The data processing system may be a memory-constrained device.

Other systems, methods, features, and advantages consistent with the present invention will become apparent to one with skill in the art upon examination of the following figures and detailed description. It is intended that such additional systems, methods, features, and advantages be included within this description and be within the scope of the invention.

BRIEF DESCRIPTION OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION

Methods and systems consistent with the present invention remove the need to include event handling code for rare events in a computer program, thus reducing the size of the compiled program, and therefore the amount of memory required store and execute it. When computer program code is compiled, that code is transformed from a programming language to a machine language instruction set for instructing a processor to execute the program. Instead of including event handling code in the original program, which results in polling an event queue, in methods and systems consistent with the present invention the program is compiled and particular instructions of the compiled code are marked in a patch table. The patch table includes substitution code for calling an event handler at that location of the marked instructions. At runtime when an event is detected, the virtual machine consults the patch table to patch a call to an event handler at the marked instructions. Accordingly, an event handler is called soon after the event is detected, without the use of polling, and since the event handling code is not part of the running program unless the event is triggered, methods and systems consistent with the present invention save memory during most run-time instances.

Reference will now be made in detail to an implementation consistent with the present invention as illustrated in the accompanying drawings.

Figure 1:
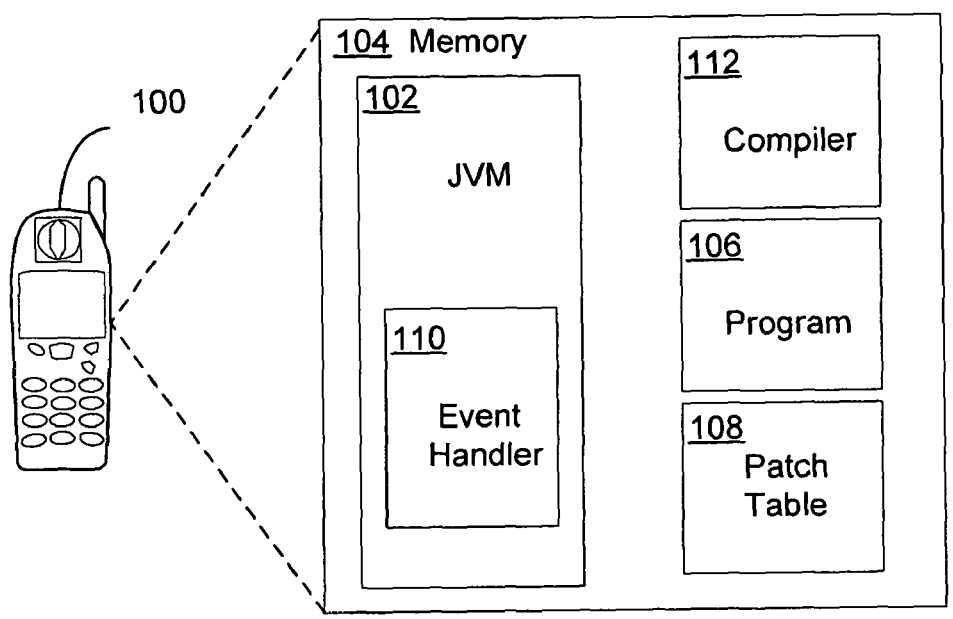
FIG. 1 illustrates an memory-constrained device consistent with the present invention.

FIG. 1 illustrates a memory-constrained computing device 100 in accordance with an embodiment of the present invention. Memory-constrained computing device 100 can include any type of computing device, including, but not limited to, a cell phone, a computer system based on a microprocessor, a digital signal processor, a portable computing device, a personal organizer, a device controller, and a computational engine within an appliance. Memory-constrained computing device 100 contains a memory 104 storing a Java Virtual Machine (JVM) 102, which in turn supports execution of both compiled and interpreted methods. (The terms JAVA, JVM and JAVA VIRTUAL MACHINE are trademarks of SUN Microsystems, Inc. of Santa Clara, Calif.) Note that JVM 102 could be any type of platform-independent virtual machine, and is not meant to be limited to a Java Virtual Machine.

Memory 104 also stores a program 106, compiler 112, and at least one patch table 108. A patch table 108 is generated when program 106 is compiled by compiler 112, and includes function patches that enable optimization of event handling in accordance with methods and systems of the present invention. The patch table 108 will be described in greater detail below. One of ordinary skill in the art will recognize that there may be one global patch table 108, or a plurality of patch tables 108. JVM 102 further includes an event handler 110. Program control is handed off to the event handler 110 in the case that an event is encountered, for proper management of the event. Event handler 110 may be a global event handler that intercepts all event handler calls. Alternatively, JVM 102 may include a plurality of event handlers 110, each of which may be customized to handle a particular event. Compiler 112 may be a Java compiler.

Figure 2:
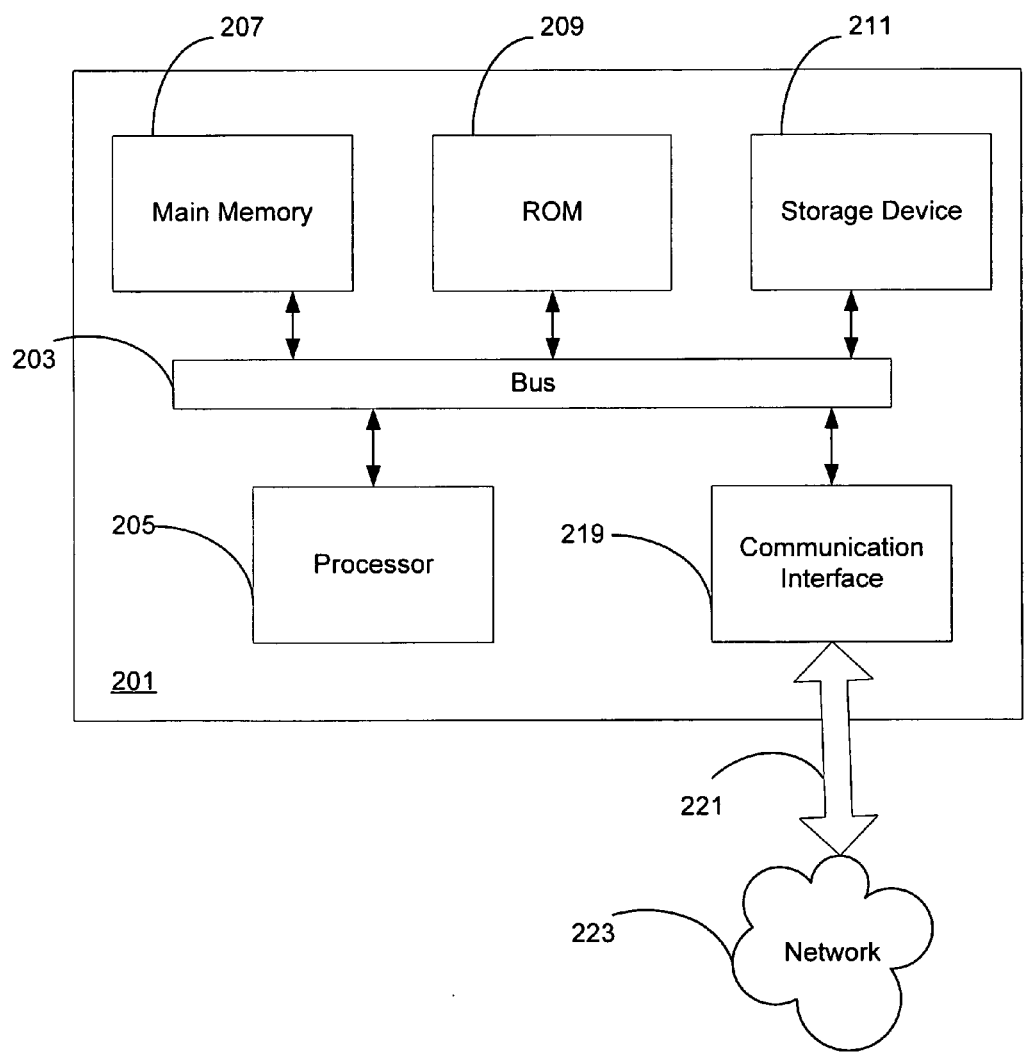
FIG. 2 illustrates an exemplary computer system.

Turning to FIG. 2, an exemplary computer system that can be configured as a memory-constrained computing system consistent with the present invention is now described. Memory-constrained computer system 201 includes a bus 203 or other communication mechanism for communicating information, and a processor 205 coupled with bus 203 for processing the information. Memory-constrained computer system 201 also includes a main memory 207, such as a random access memory (RAM) or other dynamic storage device, coupled to bus 203 for storing information and instructions to be executed by processor 205. In addition, main memory 207 may be used for storing temporary variables or other intermediate information during execution of instructions to be executed by processor 205. Main memory 207 may be configured as memory 104. Memory-constrained computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 207. Such instructions may be read into main memory 207 from another computer-readable medium, such as storage device 211. Execution of the sequences of instructions in main memory 207 causes processor 205 to perform the process steps described herein. One or more processors in a multi-processing arrangement may also be employed to execute the sequences of instructions contained in main memory 207. In alternative embodiments, hard-wired circuitry may be used in place of or in combination with software instructions. Thus, embodiments are not limited to any specific combination of hardware circuitry and software.

Further, the instructions to support the system interfaces and protocols of system 201 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now or later discovered.

Memory-constrained computer system 201 also includes a communication interface 219 coupled to bus 203. Communication interface 219 provides a two-way data communication coupling to a network link 221 that is connected to a local network 223. Wireless links may also be implemented. In any such implementation, communication interface 219 sends and receives signals that carry digital data streams representing various types of information.

Figure 3:
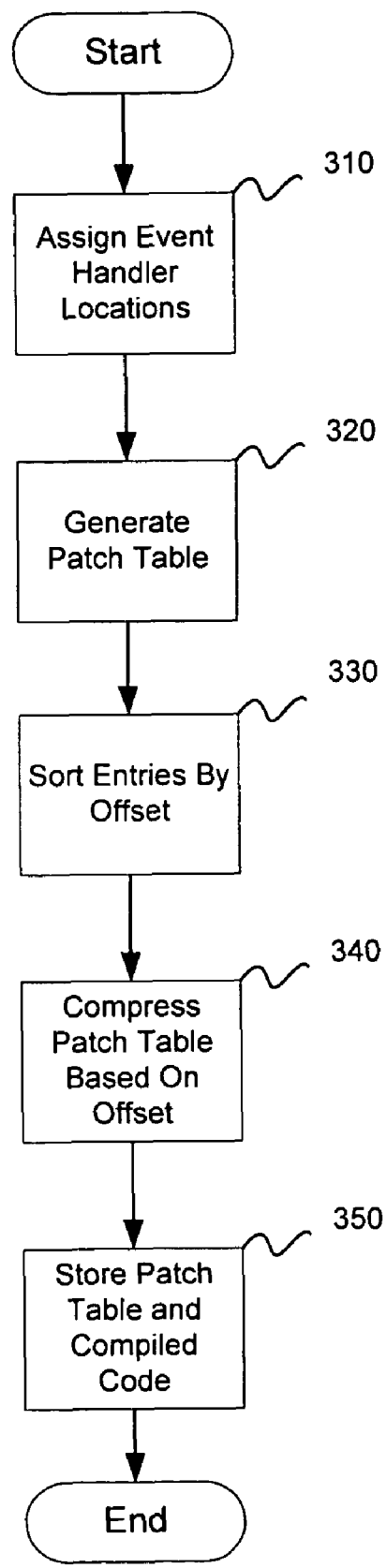
FIG. 3 illustrates a method for generating a patch table consistent with the present invention.

FIG. 3 illustrates a method for generating a patch table 108 for event handlers 110 at compile time consistent with an embodiment of the present invention. At compile time, event handler(s) 110 are assigned by the JVM 102 to a location in a function for each function in the program 106 (step 310). An event handler 110 is identified by its code address, and each location is identified by its code offset in the function. These assigned locations are selected so that control reaches one of them within the function with just a short delay after an event occurs. In one embodiment consistent with the present invention, the JVM 102 selects locations that are backward branches, function calls, or function returns. In a variation of this embodiment, other locations are selected, for example, at the end of a long linear sequences of instructions.

The compiler 112 records, in a patch table 108, the selected locations in the function (as an offset value), the corresponding event handlers 110, and compiled code instruction at those locations as entries of a patch table 108 corresponding to the function (step 320). An exemplary patch table 108 is provided in the Example below. The entries may also be annotated with additional compile-time information. For example, in a garbage-collected environment, a garbage collector of the JVM 102 identifies registers that contain object pointers and derived values by examining annotated compile-time information in the patch table.

To reduce table size for storage in the memory-constrained device, the table may be compressed. First, entries are sorted by code offset from the beginning of the function (step 330). If two consequent entries differ only by their code offset value, the JVM 102 removes the entry with the greater offset (step 340). In an alternative embodiment consistent with the present invention, if a difference between two consequent entries is minor, the JVM 102 employs differential encoding wherein only the differences between entries are recorded. Those of ordinary skill in the art will recognize other suitable techniques may be used for compiler annotations. Once patch tables 108 have been generated for event handling for the functions in the program 106, the patch tables 108 and compiled program 106 are stored in memory (step 350).

Figure 4:
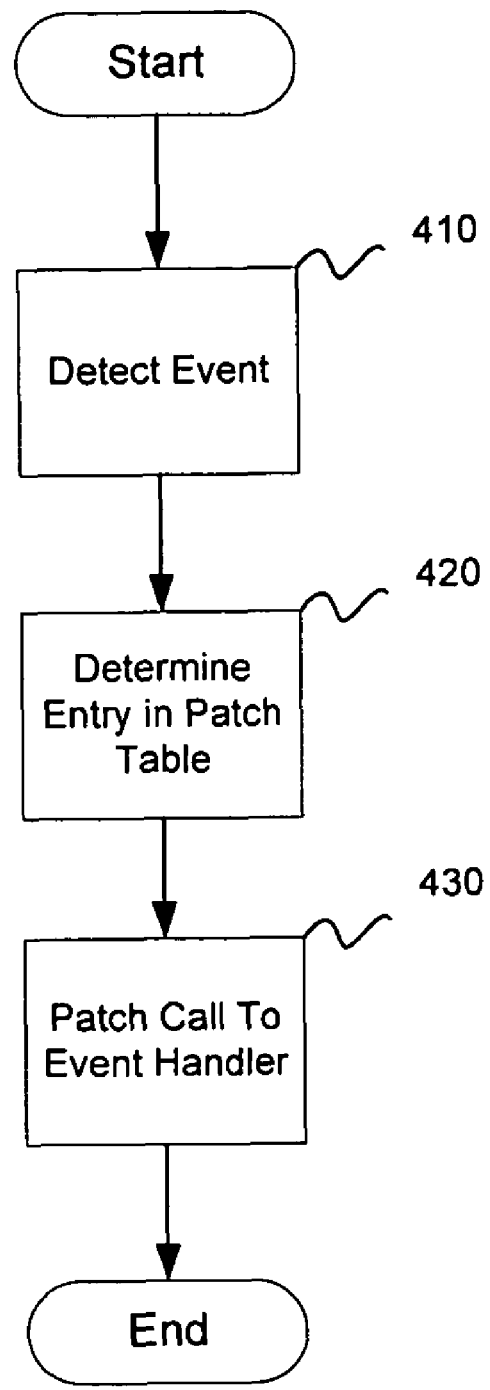
FIG. 4 illustrates a method of event handling by a virtual machine using a patch table consistent with the present invention.

FIG. 4 illustrates a method for run-time event handling by a virtual machine using a patch table 108 consistent with an embodiment of the present invention. At run-time, an event is detected (step 410). The JVM 102 then determines the appropriate entry in the patch table 108 based on the function, program counter, and the offset value in the patch table 108 (step 420). The JVM 102 then patches code into the function in accordance with the function's patch table 108 by patching a call to the specified event handler 110 (step 430).

Figure 5:
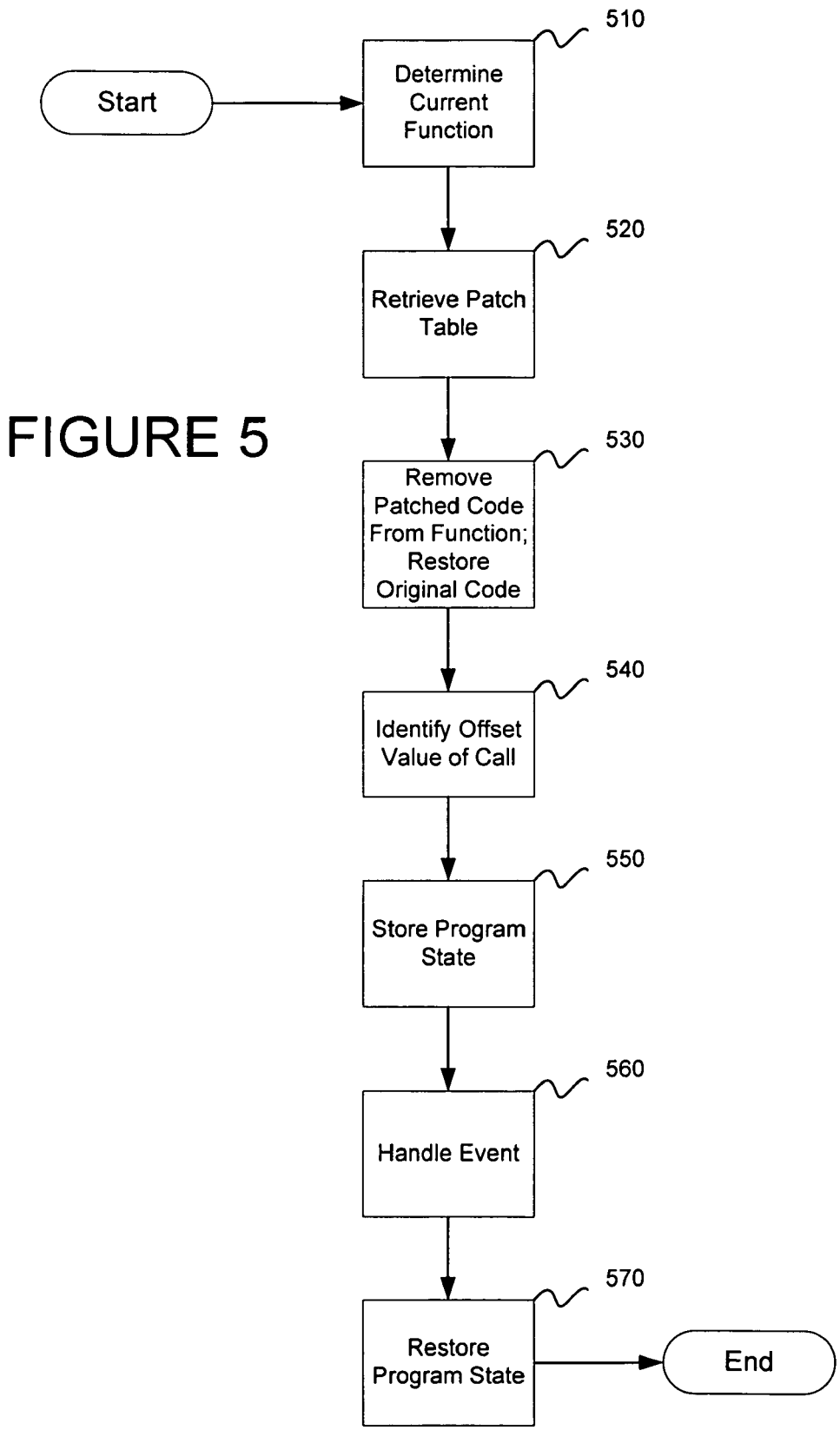
FIG. 5 illustrates a method of event handling by an event handler using a patch table consistent with the present invention.

Once the event handler 110 is called, program control switches to the event handler 110. FIG. 5 illustrates a method for run-time event handling by an event handler 110 using a patch table 108 consistent with an embodiment of the present invention. The event handler 110 determines the present function by analyzing the return address (step 510). The event handler 110 then retrieves the patch table 108 corresponding to the function (step 520). Next, the event handler 110 walks through the patch table 108 and restores the original code for that function as recorded in the patch table 108 by offset value, thus removing any patched code (step 530). The event handler 110 uses the difference between a program counter and the function address to identify which entry of the patch table 108 called the handler and to fetch compiler annotations for it (step 540). The event handler 110 then stores the current registers in accordance with the compiler annotations (step 550). Next, the event handler 110 handles the event or calls a custom event handler 110 (step 560). The event handler 110 then restores the registers in accordance with the compiler annotations (step 570).

An example of event handling using a patch table 108 is now provided with respect to an example function.

EXAMPLE

Consider the following function:
int foo (const int count) {
int s=0;
for (int i=0; i<count; i++) {
s+=i*i;
}
return s;
}
When compiled, this function may look like this:

| label | offset | code |
|---|---|---|
| foo: | 0000 | function_prologue |
|  | 0008 | mov s_reg, 0 |
|  | 0012 | mov i_reg, 0 |
| loop: | 0016 | mul tmp_reg, i_reg, i_reg |
|  | 0020 | add s_reg, tmp_reg |
|  | 0024 | inc i_reg |
|  | 0028 | cmp i_reg, count_reg |
|  | 0032 | branch_when_less loop |
|  | 0036 | mov ret_reg, s_reg |
|  | 0040 | function_epilogue |
|  | 0044 | ret |

At compile time, event handler(s) 110 are assigned by the JVM 102 to a location in a function for each function in the program 106 (step 310). To generate a patch table 108 for this function, the compiler 112 looks for function calls, returns, branches, and long code segments. The compiler 112 determines that event handlers 110 should be patched into offset 0032, which includes a branch instruction, and 0044, which is a function return. The event handler 110 may be a global event handler, such as a global timer tick handler, or a custom event handler such as handler_A and handler_B. The compiler 112 records, in a patch table 108, the selected locations in the function (as an offset value), the corresponding event handlers 110, and compiled code instruction at those locations as entries of a patch table 108 corresponding to the function (step 320). The generated patch table 108 may appear as follows:

| # | offset | original_code | custom_handler |
|---|---|---|---|
| 0 | 0032 | branch_when_less loop | handler_A |
| 1 | 0044 | ret | handler_B |

At run-time, an event is detected (step 410). The JVM 102 determines the appropriate entry in the patch table 108 based on the function, program counter, and the offset value in the patch table 108 (step 420). The JVM 102 then patches code into the function in accordance with the function's patch table 108 by patching a call to the specified event handler 110 (step 430). In this example, the global interrupt handler is called and receives the program context including the program counter (PC) and the current stack. The global event handler identifies the current function, such as by searching in a function table, fetching a value from the topmost stack frame, or decoding a call instruction prior to the return address of the topmost stack frame (step 510). Once the function is known, the function's corresponding patch table 108 is accessed (step 520). One of ordinary skill in the art will recognize that there may be one global patch table 108 for all functions, or a local patch table 108 for every patchable function. The global event handler then goes through all entries of the patch table 108 and replaces code at the offset with the appropriate event handler (step 530). The patched code may appear as follows:

| label | offset | code |
|---|---|---|
| foo: | 0000 | function_prologue |
|  | 0008 | mov s_reg, 0 |
|  | 0012 | mov i_reg, 0 |
| loop: | 0016 | mul tmp_reg, i_reg, i_reg |
|  | 0020 | add s_reg, tmp_reg |
|  | 0024 | inc i_reg |
|  | 0028 | cmp i_reg, count_reg |
|  | 0032 | call handler_A |
|  | 0036 | mov ret_reg, s_reg |
|  | 0040 | function_epilogue |
|  | 0032 | call handler_B |

When event handler handler_A is reached, the handler saves registers (including the PC) on a thread stack, receives return address from the stack or register, identifies the function in the same way as the global event handler did before (searching function table, fetching a value from the topmost stack frame, or decoding a call instruction prior to the return address of the topmost stack frame) and retrieves the function's patch table 108. The event handler handler_A then walks through all entries of the table and restores code at the offset in the function with the original_code of the entry, such that the entire function is restored to its original state (step 530). The difference between PC and the function address may be used by the event handler to identify which entry of the patch table 108 called the handler and to fetch compiler annotations from it (step 540). The event handler 110 then stores the current registers in accordance with the compiler annotations (step 550). Next, the event handler 110 handles the event (step 560). The event handler 110 then restores the registers in accordance with the compiler annotations (step 570). When control reaches event handler handler_B, that handler will behave similarly.

The patch table 108 may also include compiler annotations, such as types and locations of register values. An exemplary patch table 108 is provided:

| # | offset | original_code | custom_handler | encoded_compiler_annotation |
|---|---|---|---|---|
| 0 | 0032 | branch_when_less loop | handler_A | (int s_reg, i_reg, tmp_reg) |
| 1 | 0044 | ret | handler_B | (int ret_reg) |

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A method in a data processing system for generating an event handling patch table for a program, the data processing system including a compiler for compiling the program and a memory, comprising the steps of:
   selecting at least one location in a function of the program to perform event handling;
   at compile-time, generating a patch table including substitution code for event handling at the selected location during execution of compiled program code of the function, wherein the generating includes recording in the patch table the at least one selected location and a corresponding event handler that is not part of the program unless an event of the corresponding event handler is triggered; and
   storing the patch table in association with the compiled program code; wherein upon detecting the occurrence of the event to be handled at run-time, the patch table is consulted to patch the substitution code into the compiled program code to call the corresponding event handler at the at least one selected location free of polling.

2. The method of claim 1, wherein the step of selecting at least one location in the program includes selecting a branch instruction.

3. The method of claim 1, wherein the step of selecting at least one location in the program includes selecting a function call.

4. The method of claim 1, wherein the step of selecting at least one location in the program includes selecting a function return.

5. The method of claim 1, wherein the step of selecting at least one location in the program includes selecting long linear sequence of instructions.

6. The method of claim 1, further comprising compressing the patch table.

7. The method of claim 6, wherein the step of compressing the patch table includes:
   determining whether two consequent entries in the patch table differ only by an offset value; and
   removing the entry with the greatest offset value, when the two consequent entries differ only by an offset value.

8. The method of claim 1, wherein the at least one location comprises an offset value.

9. A computer-readable medium storing computer executable instructions for performing a method of event handling using a patch table during execution of a compiled program, the method comprising the steps of:
   selecting at least one location in a function of a program to perform event handling;
   at compile-time, generating a patch table including substitution code for event handling at the selected location during execution of compiled program code of the function, wherein the generating includes recording in the patch table the at least one selected location and a corresponding event handler that is not part of the program unless an event of the corresponding event handler is triggered;
   storing the patch table in association with the compiled program code;
   detecting the occurrence of the event to be handled at run-time;
   patching based on the patch table the substitution code into the compiled program code to call the corresponding event handler for handling the event at the at least one selected location free of polling; and
   executing the corresponding event handler.

10. The computer-readable medium of claim 9, further comprising replacing an instruction at the at least one location with a call to a global event handler.

11. The computer-readable medium of claim 10, further comprising calling the global event handler to execute the corresponding event handler.

12. The computer-readable medium of claim 11, further comprising storing the program state of the compiled program code before executing the corresponding event handler.

13. The computer-readable medium of claim 9, further comprising determining whether the event is detected while user code is active.

14. The computer-readable medium of claim 13, wherein when user code is not active, waiting until program control returns to a user thread before handling the event.

15. The computer-readable medium of claim 14, further comprising storing the detection of the event.

16. The computer-readable medium of claim 9, where in the program is executed on a Java Virtual Machine.

17. A data processing system for handling events during execution of program code, comprising:

a memory storing a virtual machine;
a processor for executing the virtual machine; and
a compiler stored on the memory for:
    selecting at least one location in a function of a program to perform event handling;
    at compile-time, generating a patch table including substitution code for event handling at the selected location during execution of compiled program code of the function, wherein the generating includes recording in the patch table the at least one selected location and a corresponding event handler that is not part of the program unless an event of the corresponding event handler is triggered; and
storing the patch table in association with the compiled program code; wherein upon detecting the occurrence of the event to be handled at run-time, the virtual machine consults the patch table to patch the substitution code into the compiled program code to call the corresponding event handler at the selected location free of polling.

\* \* \* \* \*